(12) United States Patent
Van Delden et al.

(10) Patent No.: US 10,899,421 B2
(45) Date of Patent: Jan. 26, 2021

(54) LOAD ARRANGEMENT FOR POWERING A LOAD IN LIQUID

(71) Applicant: KONINKLIJKE PHILIPS N.V., Eindhoven (NL)

(72) Inventors: Martinus Hermanus Wilhelmus Maria Van Delden, Venlo (NL); Michiel Johannes Jongerius, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 16 days.

(21) Appl. No.: 16/470,460

(22) PCT Filed: Dec. 14, 2017

(86) PCT No.: PCT/EP2017/082923
§ 371 (c)(1),
(2) Date: Jun. 17, 2019

(87) PCT Pub. No.: WO2018/114630
PCT Pub. Date: Jun. 28, 2018

(65) Prior Publication Data
US 2020/0010160 A1    Jan. 9, 2020

(30) Foreign Application Priority Data

Dec. 20, 2016 (EP) .................................... 16205379

(51) Int. Cl.
*B60L 1/00* (2006.01)
*B63B 59/04* (2006.01)
(Continued)

(52) U.S. Cl.
CPC .............. *B63B 59/04* (2013.01); *B08B 17/02* (2013.01); *H02J 50/05* (2016.02); *H02J 50/40* (2016.02)

(58) Field of Classification Search
CPC ........................................................ B63B 59/04
(Continued)

(56) References Cited

U.S. PATENT DOCUMENTS 5,322,569 A    6/1994    Titus et al.

FOREIGN PATENT DOCUMENTS

GB          470616 A      6/1937
WO      2009025546 A1    2/2009
(Continued)

OTHER PUBLICATIONS

International Search Report and Written Opinion, International Application No. PCT/EP2017/082923, dated Apr. 11, 2018.
(Continued)

*Primary Examiner* — Rexford N Barnie
*Assistant Examiner* — Dru Parries (57) ABSTRACT

A load arrangement powers loads on a surface (30) of a marine structure exposed to a fouling liquid (10), and has a transmitter arrangement (110) and at least one carrier medium (100) having embedded loads (20). Front electrodes (130) are arranged to be coupled to the liquid, and back electrodes (120) have back electrically conductive layers embedded in the carrier medium to form, in combination with an opposite area of the marine 5 structure and a dielectric layer (4a), a back capacitor for capacitive transfer of the supply current between the second power node and one pole of the power source coupled to the marine structure. The transmitter arrangement has a supply line (111) and a multitude of transmitters (114) galvanically connected to the supply line. The multitude of transmitters is distributed along the supply line to be arranged near the multiple front electrodes to form 10 short conductive paths (113).

16 Claims, 4 Drawing Sheets

(51) Int. Cl.
*H02J 50/05* (2016.01)
*H02J 50/40* (2016.01)
*B08B 17/02* (2006.01)

(58) Field of Classification Search
USPC .......................................................... 307/9.1
See application file for complete search history.

(56) References Cited

FOREIGN PATENT DOCUMENTS

| WO | 2010079401 A1 | 7/2010 |
|----|---------------|--------|
| WO | 2014188347 A1 | 11/2014 |
| WO | 2016000980 A1 | 1/2016 |
| WO | 2016096770 A1 | 6/2016 |
| WO | 2016193055 A1 | 12/2016 |
| WO | 2016193114 A1 | 12/2016 |

OTHER PUBLICATIONS

Salters, B. et al., "Prevention of biofouling using UV-light emission from low voltage miniature LEDs", Pacific 2015.

Salters, fr et al., "Shipshape—Runwell", PR-TN 2016/00140, Jun. 23, 2016.

Salters, B. et al., "Progress in Philips RunWell UV-based antifouling technology", ICMCF, 2016, presentation 38B.

Piola, R. et al., "Low voltage UV LEDs for marine biofouling control: Laboratory and field testing", ICMCF, 2016, presentation 48B.

LOAD ARRANGEMENT FOR POWERING A LOAD IN LIQUID

CROSS-REFERENCE TO PRIOR APPLICATIONS

This application is the U.S. National Phase application under 35 U.S.C. § 371 of International Application No. PCT/EP2017/082923, filed on Dec. 14, 2017, which claims the benefit of EP Patent Application No. EP 16205379.7, filed on Dec. 20, 2016. These applications are hereby incorporated by reference herein.

FIELD OF THE INVENTION

The invention relates to a load arrangement for powering loads on surface of a marine structure exposed to a liquid, such as seawater. The liquid constitutes an electrically conductive medium. The loads are embedded in a carrier and are coupled between a first power node and a second power node for receiving supply current from a power source.

BACKGROUND OF THE INVENTION

Biofouling of surfaces which are exposed to water, during at least a part of their lifetime, is a well-known phenomenon, which causes substantial problems in many fields. For example, in the field of shipping, biofouling on the hull of ships is known to cause a severe increase in drag of the ships, and thus increased fuel consumption of the ships. In this respect, it is estimated that an increase of up to 40% in fuel consumption can be attributed to biofouling.

In general, biofouling is the accumulation of microorganisms, plants, algae, small animals and the like on surfaces. According to some estimates, over 1,800 species comprising over 4,000 organisms are responsible for biofouling. Hence, biofouling is caused by a wide variety of organisms, and involves much more than an attachment of barnacles and seaweeds to surfaces. Biofouling is divided into micro fouling which includes biofilm formation and bacterial adhesion, and macro fouling which includes the attachment of larger organisms. Due to the distinct chemistry and biology that determine what prevents them from settling, organisms are also classified as being hard or soft. Hard fouling organisms include calcareous organisms such as barnacles, encrusting bryozoans, mollusks, polychaetes and other tube worms, and zebra mussels. Soft fouling organisms include non-calcareous organisms such as seaweed, hydroids, algae and biofilm "slime". Together, these organisms form a fouling community.

As mentioned in the foregoing, biofouling creates substantial problems. Biofouling can cause machinery to stop working and water inlets to get clogged, to mention only two other negative consequences than the above-mentioned increase of drag of ships. Hence, the topic of anti-biofouling, i.e. the process of removing or preventing biofouling, is well-known.

WO 2014/188347 A1 describes a method of anti-fouling of a surface while said surface is at least partially submersed in a liquid environment, in particular an aqueous or oily environment. The method involves providing an anti-fouling light from light sources embedded in an optical medium on the exposed surface, the optical medium having a substantially planar emission surface. The anti-fouling light is emitted from the emission surface of the optical medium, in a direction away from the exposed surface, and the anti-fouling light may be ultraviolet light. The light sources need to be electrically powered and so constitute an example of loads to be powered on a surface of a marine structure. WO 2014/188347 A1 describes to power such loads via wires embedded in said optical medium.

WO2016193114 A1 describes an object that during use is at least partly submerged in water, the object further comprising an anti-bio fouling system comprising an UV emitting element, wherein the UV emitting element comprises one or more light sources and is configured to irradiate with UV radiation during an irradiation stage one or more of (i) a part of an external surface of said object and (ii) water adjacent to said part of said external surface, wherein the object is selected from the group consisting of a vessel and an infrastructural object, wherein the object further comprises a water switch, wherein the anti-bio fouling system is configured to provide said UV radiation to said part in dependence of the water switch being in physical contact with the water.

WO2010079401 A1 describes an optical reactor has a reactor enclosure defining a reaction chamber. In the reaction chamber, a light source operating at a very high frequency is arranged to radiate light to a fluid to be treated. A low voltage electrode is arranged to surround the light source. The light source is energized by a driving circuit which is arranged adjacent to the reactor enclosure. The driving circuit has a high voltage output terminal connected to a high voltage input terminal of the light source. The driving circuit has a low voltage output terminal which is connected to the low voltage electrode.

WO2016193055 describes an object, that during use is at least partly submerged in water, wherein the object is selected from the group consisting of a vessel and an infrastructural object, the object further comprising an anti-biofouling system comprising an UV emitting element, wherein the UV emitting element is configured to irradiate with UV radiation during an irradiation stage one or more of (i) a first part of an external surface of said object and (ii) water adjacent to said first part of said external surface of said object, wherein the object further comprises protruding elements with the UV emitting element configured between the protruding elements and configured depressed relative to the protruding elements.

WO2016096770 A1 describes a marine cable device configured for preventing or reducing biofouling along its exterior surface, which during use is at least temporarily exposed to water. The marine cable device according to the present invention comprises at least one light source configured to generate an anti-fouling light and at least one optical medium configured to receive at least part of the anti-fouling light. The optical medium comprises at least one emission surface configured to provide at least part of said anti-fouling light on at least part of said exterior surface.

SUMMARY OF THE INVENTION

It follows from the foregoing that WO 2014/188347 A1 addresses the subject of providing anti-fouling light on a surface of a marine structure. The electrical loads are embedded in a carrier and powered via wires embedded in the carrier. For connecting respective carriers to a power source, galvanic connections have to be made, e.g. using power lines and power connectors, which is expensive and unreliable. So, there is a need to provide power to such light sources and other loads in a more convenient and reliable way.

The invention has as an object to provide a load arrangement for powering loads on a surface exposed to a liquid.

According to the invention, a load arrangement is provided for powering loads on a surface of a marine structure exposed to a liquid, the liquid constituting an electrically conductive medium, the load arrangement comprising:
- a transmitter arrangement and
- at least one carrier medium shaped as a sheet;

the carrier medium having a back surface to be arranged in or on the surface of the marine structure and a front surface to be in contact with the liquid, the carrier medium comprising
- a multitude of loads embedded in the carrier medium;
- each load being coupled between a first power node and a second power node for receiving supply current from a power source;
- multiple front electrodes at the front surface, each connected to one or more of the first power nodes and arranged to be coupled to the electrically conductive medium; and
- one or more back electrodes connected to one or more of the second power nodes, each back electrode comprising a back electrically conductive layer embedded in the carrier medium near the back surface to form, in combination with an opposite area of the marine structure and a dielectric layer, a back capacitor for capacitive transfer of the supply current between the second power node and one pole of the power source coupled to the marine structure;

the transmitter arrangement having a supply line arranged for coupling to the other pole of the power source and a multitude of transmitters galvanically connected to the supply line, the multitude of transmitters being distributed along the supply line to be arranged in contact with the electrically conductive medium near the multiple front electrodes, respective transmitters being located near respective one or more front electrodes.

According to a further aspect of the invention a marine structure is provided having a surface to be exposed to a liquid, the liquid constituting an electrically conductive medium, the marine structure comprising at least one load arrangement as defined above, wherein
- the at least one carrier medium is attached to the marine structure having the back surface in or on the surface of the marine structure,
- the at least one transmitter arrangement is arranged at the surface of the marine structure near the multiple front electrodes, and wherein the marine structure comprises
- a power source coupled between the marine structure and the supply line of the transmitter arrangement for transferring the supply current from the power source to the loads.

According to a further aspect of the invention a method is provided for installing a load arrangement as defined above, the method comprising
- attaching the at least one sheet to the surface of a marine structure to be exposed to the liquid;
- arranging the transmitter arrangement at the surface of the marine structure near the multiple front electrodes; and
- providing the power source coupled between the marine structure and the supply line of the transmitter arrangement for transferring the supply current from the power source to the loads.

The above features have the following effect. The carrier medium is a mechanical element that physically carries the loads. The carrier medium has a front surface in contact with the liquid and a back surface to be arranged in or on the surface of the marine structure. The loads are embedded in the carrier medium, e.g. light sources embedded in an optical medium. Each load is coupled between a first power node and a second power node for receiving supply current from the power source. Multiple front electrodes are located at the front surface. Each front electrode is connected to one or more of the first power nodes, and arranged to be coupled to the electrically conductive medium.

The load arrangement also has one or more back electrodes connected to one or more of the second power nodes. Each back electrode has a back electrically conductive layer embedded in the carrier medium near the back surface. The layer forms, in combination with an opposite area of the marine structure and a dielectric layer, a back capacitor for capacitive transfer of the supply current between the second power node and the marine structure coupled to one pole of the power source.

The transmitter arrangement has a supply line arranged for coupling to the other pole of the power source. A multitude of transmitters is galvanically connected to the supply line and is distributed along the supply line. The transmitters are to be arranged in contact with the electrically conductive medium near the multiple front electrodes. The individual transmitters are located near a respective subset of the front electrodes.

In use, the transmitter arrangement may be installed near the carrier medium. For example, various elements having transmitters of the transmitter arrangement may be installed on top of the carrier medium, but may also be installed, at least partly, in spaces between the sheets or tiles of the carrier medium.

Effectively, a load circuit is formed by the various above elements for transferring the supply current from the power source via, successively, the supply line, the multitude of transmitters, the electrically conductive medium, the multiple front electrodes, the first power nodes, the loads, the second power nodes, the one or more back capacitors and the marine structure back to the power source. Advantageously, the transmitter arrangement provides multiple, relatively short conductive paths from the transmitters to respective front electrodes. Hence less current will leak away to areas of the marine structure that are in conductive contact with the liquid, e.g. part of a painted ship's hull where the paint layer is damaged.

In an embodiment of the load arrangement, the front electrodes comprise conductive parts at the front surface galvanically in contact with the liquid for transfer of the supply current between the first power node and the electrically conductive medium. Effectively, the front electrode is in conductive contact with the electrically conductive medium, and may conduct any type of current.

In an embodiment of the load arrangement, the front electrodes comprise electrically conductive layers embedded in the carrier medium near the front surface, the embedded layers being arranged to form, in combination with an opposite area of the liquid and a dielectric layer constituted by material of the carrier medium, front capacitors for capacitive transfer of the supply current between the first power node and the electrically conductive medium. Effectively a capacitance is formed by the front electrically conductive layer and the liquid constituting an electrically conductive medium, via a dielectric layer formed by the carrier material. Advantageously, such capacitance may conduct AC current of an appropriate frequency, while also limiting the amount of current in the event of a short-circuit or malfunction of the load. Also, by being embedded, the electrically conductive layers are separated and protected from the liquid, e.g. against corrosion, fouling and reduced conductance.

In an embodiment of the load arrangement, the supply line has a supply conductor in an isolating cover and one or more transmitters comprising an electrically conductive protrusion extending from the isolating cover for contacting the liquid. Optionally, one or more transmitters are formed by bare areas of the supply conductor locally not having the isolating cover for contacting the liquid. In use, the supply line having the protrusions or bare areas is installed near the multiple front electrodes. By being distributed along the supply line, the transmitters are easily positioned near respective one or more front electrodes.

In an embodiment of the load arrangement, the supply line comprises a supply conductor in an isolating cover and each transmitter comprises a transmitter layer embedded in the isolating cover near the surface thereof, the transmitter layer being electrically conductive and connected to the supply conductor to form, in combination with an opposite area of the liquid and a dielectric layer constituted by material of the isolating cover, a transmitter capacitor for capacitive transfer of the supply current between the supply line and the liquid. Effectively a capacitance is formed by the transmitter layer and the liquid constituting an electrically conductive medium, via a dielectric layer formed by the material of the isolating cover. Advantageously, such capacitance may conduct AC current of an appropriate frequency, while also limiting the amount of current in the event of a short-circuit or malfunction of the load. Also, by being embedded, the transmitter layers are separated and protected from the liquid, e.g. against corrosion, fouling and reduced conductance.

In an embodiment of the load arrangement, the transmitter arrangement comprises a multi-lead cable having respective transmitters at respective leads. The multi-lead cable is configured to connect the leads to said other pole of the power source for constituting the supply line and to separate and distribute the leads across the surface of the marine structure. The multitude of leads starts at the power source connected to said one pole, and is subsequently used to be separated and distributed across the surface. In use, the multi-lead cable provides a pattern of transmitters distributed along the paths where the various leads are installed. Advantageously, no interconnections have to be made along the trajectory between the power source pole and the transmitters.

In an embodiment of the load arrangement, the transmitter arrangement comprises a wire-mesh having isolated wires and respective transmitters at respective wires, the wire-mesh being configured to connect to said other pole of the power source for constituting the supply line and to distribute the wire-mesh across the surface of the marine structure. Advantageously, a wire-mesh is a two-dimensional structure that can be easily distributed across a surface to be covered. In use, the wire-mesh inherently provides a pattern of transmitters evenly distributed across the surface covered by the wire mesh.

In an embodiment of the load arrangement, the carrier medium comprises inductors connected with the loads for constituting, in combination with at least one of the back, front and transmitter capacitors, circuits resonant at a resonance frequency being powered by the power source generating an AC supply voltage at the resonance frequency. Effectively, by forming a resonant circuit, the impedance of the circuit as present between said one pole of the power source and the front electrodes is lowered. Advantageously, a lower AC voltage at the front electrodes is sufficient for delivering a required supply current for the load. Also, less current will leak through undesired paths, such as damaged areas of a coated ship's hull or bare components such as the rudder.

In an embodiment of the load arrangement, the carrier medium comprises auto-transformers connected with the loads, each auto-transformer having a low voltage connection connected to the front and back electrodes, and a high voltage connection connected to the load. The auto-transformer transforms a low voltage arriving on the electrodes into a higher voltage on the load. Effectively, the impedance of the circuit as present between said one pole of the power source and the front electrodes is lowered. Advantageously, a lower AC voltage at the front electrodes is sufficient for delivering a required supply current for the load. Also, less current will leak through undesired paths, such as damaged areas of a coated ship's hull or bare components such as the rudder.

Optionally, different inductors or autotransformers in combination with respective back, front and transmitter capacitors constitute respective circuits resonant at different resonance frequencies, for selectively being powered by the power source generating an AC supply voltage at the different resonance frequencies. Advantageously, by providing the AC supply voltages at respective different frequencies, respective areas having the respective frequencies can separately be powered and controlled.

In an embodiment of the load arrangement, the carrier medium comprises capacitors connected in series with the loads. Advantageously, such capacitances may conduct AC current of an appropriate frequency, while also limiting the amount of current in the event of a short-circuit or malfunction of the load.

In an embodiment of the load arrangement, the carrier medium is an optical medium and the load is an UV light source for emitting anti-fouling light for anti-fouling of the surface of the marine structure in contact with the liquid being a fouling liquid containing biofouling organisms. In a practical embodiment of the load arrangement, the load may be a light source to be adapted to emit ultraviolet light, and the carrier medium may be an optical medium in the form of a slab or sheet, wherein the front surface is an emission surface for emitting the anti-fouling light, while the both surfaces of the optical medium are substantially planar and extend substantially parallel to each other. Such optical medium is very well suitable to be applied to the surface of the marine structure. A general advantage of using ultraviolet light for anti-biofouling is that the microorganisms are prevented from adhering and rooting on the surface to be kept clean.

When the light source is adapted to emit ultraviolet light, it is advantageous for the optical medium to comprise an ultraviolet transparent material such as ultraviolet transparent silicone. In a general sense, the fact that the optical medium comprises material that is configured to allow at least part of the anti-fouling light to distribute through the optical medium may be understood such as to imply that the optical medium comprises material that is substantially transparent to the anti-fouling light.

It is a practical possibility for the load arrangement according to the invention to comprise a single optical medium and a plurality of light sources. The medium may also comprise one or more mirrors to reflect light to the emission surface. In such a case, the optical medium of the load arrangement can be of any suitable shape and size, wherein light sources such as LEDs are distributed throughout the optical medium, and wherein the light emitted by each of the light sources is distributed across the emission surface of the optical medium to an optimized extent. The light sources can be arranged in a series of parallel connections in a grid to the respective front and back electrodes.

The invention is applicable in various contexts. For example, the load arrangement according to the invention may be applied in the context of a marine vessel. Optionally, a marine structure to be exposed to a liquid has a surface comprising the above load arrangement, wherein the load arrangement is attached to said exposed surface, for example the loads comprising UV light sources for anti-fouling of the exposed surface when immersed in a fouling liquid containing biofouling organisms. Also, in a method for installing the above load arrangement, the method may comprise the step of attaching the load arrangement to an exposed surface of a marine structure. Also, use of the above load arrangement is foreseen, while the load arrangement is installed to an exposed surface of a marine structure, e.g. for anti-fouling of the exposed surface when immersed in a fouling liquid containing biofouling organisms. In such contexts, the load arrangement is arranged so as to have a function in keeping, for example, a vessel's hull clean from biofouling, which does not alter the fact that numerous other application possibilities exist in that context as well.

The above-described and other aspects of the invention will be apparent from and elucidated with reference to the following detailed description of embodiments.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

In the following, the present invention will be explained with reference to an application scenario, in which the load arrangement is used for powering of UV light sources (in particular LEDs), that may be mounted to the exposed surface of a ship hull to counter bio-fouling. However, any other load on the surface of a marine structure may be powered according to the invention, e.g. a sonar unit or other sensors. Before the details of various embodiments of disclosed subject matter will be explained, the general idea and known approaches to counter bio-fouling in such an application scenario will be discussed. A light source in the load arrangement may be chosen for anti-fouling to specifically emit ultraviolet light of the C type, which is also known as UVC light, and even more specifically, light with a wavelength roughly between 220 nm and 300 nm. In practice the peak efficiency is achieved around 265 nm, with a fall-off towards higher and lower wavelengths. At 220 nm and at 300 nm, is has dropped to ~10% efficiency.

It has been found that most fouling organisms are killed, rendered inactive, or rendered unable to reproduce by exposing them to a certain dose of the ultraviolet light. A typical intensity which appears to be suitable for realizing anti-biofouling is 10 mW per square meter. The light may be applied continuously or at a suitable frequency, whatever is appropriate in a given situation, especially at a given light intensity. An LED is one type of UVC lamp which may be applied as the light source of the load arrangement. It is a fact that LEDs can generally be included in relatively small packages and consume less power than other types of light sources. Also, LEDs can very well be embedded in a slab of material. Furthermore, LEDs can be manufactured to emit (ultraviolet) light of various desired wavelengths, and their operating parameters, most notably the output power, can be controlled to a high degree. The LED may be a so-called side-emitting LED, and may be arranged in the optical medium so as to emit the anti-fouling light in directions along the plane of the sheet.

Anti-fouling light may be distributed through an optical medium comprising a silicone material and/or UV grade (fused) silica, and emitting the anti-fouling light from the optical medium and from the surface of a marine structure. UV-C irradiation prevents the (initial) settlement of micro- and macro organisms, for instance on a ship hull. The problem with bio-films is that as their thickness increases over time due to growth of the organisms its surface roughens. Hence, the drag increases, requiring the engine to consume more fuel to maintain the ship's cruising speed, and thus the operational costs increase. Another impact of bio-fouling can be a reduction in the cooling capacity of a pipe radiator or a flow capacity reduction of salt water intake filters and pipes. Therefore, service and maintenance costs increase.

A potential solution to counter bio-fouling of the ship hull can be the coverage of the exterior hull with slabs of for example UV-C transparent materials having embedded UV-C LED(s). These slabs, or generally any load arrangement (i.e. elements or arrangements consuming electrical energy for generating light), are located below the waterline. This is because the submerged surfaces are predominantly sensitive to bio-fouling and, hence, responsible for the increase in drag. Hence, electrical power needs to be delivered under the water-line towards the loads.

The combination of electricity, water and the rough and tough environment of the off-shore industry poses a real challenge. This is because (sea) water is a good electric conductor and, hence, short circuits may easily arise. Furthermore, water decomposes under the influence of an electrical current. In the case of sea water, it decomposes under DC current in chlorine and hydrogen gas. Under AC current, both gasses are formed alternatingly at each electrode. An additional problem with the gasses formed is that chlorine can enhance the already natural occurring corrosion of the steel ship hull and accelerates the degradation of other materials including the UV-C LEDs if not hermetically sealed. The hydrogen gas on the other hand can cause iron embrittlement, eventually leading to severe crack formation within the iron bulk.

To counter natural corrosion of the steel hull most ships are coated or painted and in addition often equipped with passive or active cathodic protecting systems such that the ship hull remains protected against natural corrosion when the protective coat or paint fails locally. Passive systems use sacrificial Zinc, Aluminum or Iron anodes that dissolve electro-chemically over time, whereas active systems impress a DC current in using anodes made of MMO-Ti (mix metal oxides) coated Titanium or Pt/Ti (Platinum coated Titanium). For active systems impressing a DC current (impressed current cathodic protection, ICCP) into the sea water, careful monitoring is required. Too large current may cause iron embrittlement due to excessive hydrogen formation, whereas too large small currents may cause under protection allowing the iron hull to still dissolve slowly. Obviously, anti-fouling solutions should not render the cathodic protection system to fail.

Various loads, such as UV LEDs of a biofouling prevention system, require electrical power. UV LEDs are two leaded, polarity sensitive light-sources, which require a DC current to operate. In conventional approaches, wired conductors can be used to provide supply current by means of galvanic contacts. However, traditional fully-wired approaches require complex wiring and connector schemes in order to connect the power source with the loads.

An approach is now described which uses the sea water as a common conductive medium between multiple front electrodes near multiple transmitters connected to one pole of the power source. A connection to the other pole of the power source is formed by conductive parts of the marine structure itself, e.g. (parts of) the metal ship's hull.

A wireless concept using seawater as one conductor may supply power to the loads without the need for the construction of a galvanic connection between loads. However, power supply may fail in the case of external inflicted damage, or when other parasitic parallel current paths are available, e.g. to a non-shielded grounded rudder or propeller. For example on a ship, hull paint may be damaged so severe that a deep scratch runs from a carrier's surface all the way down to the steel hull, such that the seawater unfortunately wets the common ground terminal. A local short circuit may arise. The unwanted short-circuit may give rise to a lower resistance current path if compared to the path through the LEDs. Hence, the majority of the AC power will no longer flow through the UV-C LEDs, i.e. the concept is seriously compromised due the externally inflicted damage. The proposed system is intended to avoid that the power supply to other loads is seriously affected.

Figure 1:
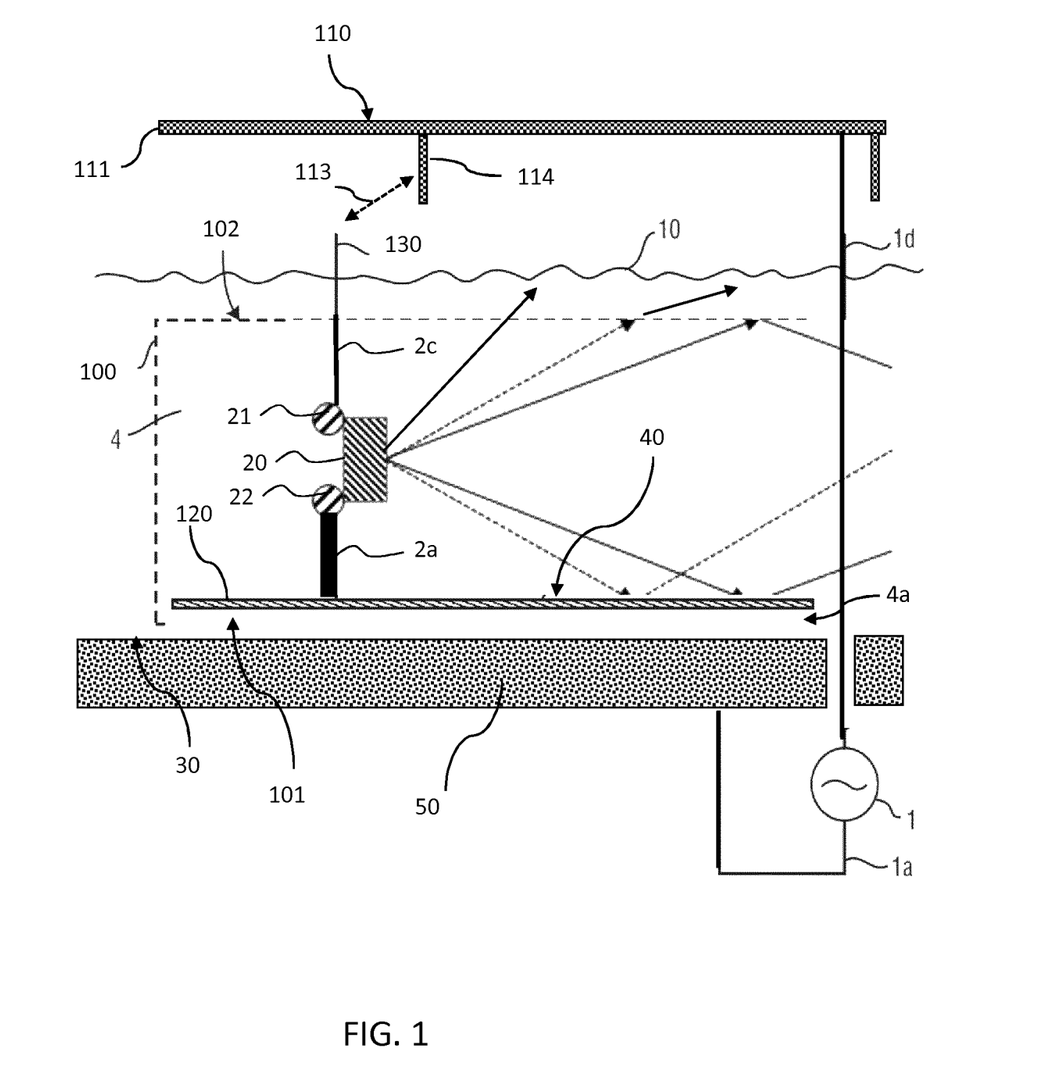
FIG. 1 shows an example of a load arrangement.

FIG. 1 shows an example of a load arrangement. In the example, the load is a light source 20 for anti-fouling of a surface 30 of a marine structure 50 exposed to a liquid 10 constituting an electrically conductive medium, for example a fouling liquid like sea water containing biofouling organisms. The load arrangement comprises a carrier medium 100 as indicated by dashed lines and a transmitter arrangement 110 shown to be positioned above the carrier 100 and the surface 30 of the marine structure. In use, the marine structure and load arrangement are submersed in the liquid, e.g. seawater.

The carrier medium has a front surface 102 facing the liquid and a back surface 101 covering, at least partly, the surface 30 and the transmitter arrangement. A load 20 is embedded in the carrier medium and is coupled between a first power node 21 and a second power node 22 for receiving supply current from a power source 1. A front electrode 130 is located at the front surface 102, and is connected to the first power node 21 via a conductor 2c. The front electrode 130 is arranged for coupling to the electrically conductive medium 10. In the example, the front electrode extends into the liquid to make galvanic contact. A back electrode 120 is located at the back surface 101. Only one load is shown in the Figure, but the carrier medium has a multitude of such embedded loads and respective electrodes.

One pole of the power source is coupled to the marine structure, as indicated by power connection 1a. Each back electrode 120 has a back electrically conductive layer embedded in the carrier medium near the back surface. The layer forms, in combination with an opposite area of the marine structure and a dielectric layer (4a), a back capacitor. The back capacitor enables capacitive transfer of the supply current between the second power node 22 and one pole of the power source via the marine structure.

The Figure further shows the transmitter arrangement 110 having a supply line 111, which is coupled to the other pole of the power source, as indicated by power connection 1d. The transmitter arrangement 110 has a multitude of transmitters 114 galvanically connected to the supply line. The supply line has a supply conductor in an isolating cover. One or more transmitters may be formed by electrically conductive protrusions extending from the isolating cover for contacting the liquid. Also, one or more transmitters may be formed by bare areas of the supply conductor locally not having the isolating cover for contacting the liquid. The transmitters are distributed along the supply line and are in contact with the electrically conductive medium. A respective transmitter is positioned near one or more front electrodes, so that a relatively short path 113 is formed between a respective transmitter and respective one of the front electrodes.

The transmitter arrangement 110 is connected to a pole of the power source 1 via isolated parts of the supply line. The supply line may connect to further isolated parts of the transmitter arrangement installed across the surface of the marine structure, which surface is covered by the carrier medium having loads to be powered. For example, the transmitter arrangement may have isolated wires or metal strips, a grating or a mesh or another form of isolated conductors distributed across the surface of the marine structure. From the isolated parts the transmitters extend is a pattern that is distributed across the surface to be powered via the front electrodes. So many short distance paths are formed between respective transmitters and respective front electrodes near such transmitters.

The front electrodes have conductive parts at the front surface galvanically in contact with the liquid for transfer of the supply current between the first power node and the electrically conductive medium. Alternative connections of the front electrode to the transmitters are may also be considered, e.g. coupling to the liquid via a capacitor formed by a front conductive layer embedded near the front surface 102. The front electrodes then have electrically conductive layers embedded in the carrier medium near the front surface. The embedded layers being arranged to form, in combination with an opposite area of the liquid and a dielectric layer constituted by material of the carrier medium, front capacitors for capacitive transfer of the supply current between the first power node and the electrically conductive medium.

The carrier may comprise an optical medium 4 and be shaped in sheet form, the loads being light sources. The front surface of the optical medium may constitute an emission surface, and may be substantially planar to the back surface of the carrier, the surfaces extending substantially parallel to each other. The Figure diagrammatically shows a sectional view of a portion of an optical medium 4, a LED constituting a load 20 embedded in the optical medium, and a mirror 40 that may be present near the back surface of the optical medium. Possible paths of light beams are diagrammatically indicated by means of arrows. The light source may be adapted to emit ultraviolet light, for example an UV-C LED as elucidated in the section above. The optical medium allows at least part of the light to distribute through the optical medium, as shows by the arrows emanating from the light source, propagating and reflecting internally in the layer of the optical medium. In the examples one light source is shown and explained. In practice, the load arrangement may comprise a single optical medium and a plurality of light sources, and a corresponding, associated plurality of mirrors. Each of the mirrors may be electrically coupled to one or more of the light sources.

The mirror may constitute the back electrode, being electrically conductive and electrically coupled to the light source at the second power node 22 by lead 2a. For example, the mirror is a thin metallic layer of a reflective, conductive metal. At least part of the mirror may be a scattering layer. In the embodiment as shown in FIG. 1 the back electrode 120 is arranged to form a capacitor in combination with a dielectric layer 4a and an area of the surface of the marine structure opposite the back electrode. The capacitor enables capacitive transfer of electrical power between the back electrode and the power source 1 operating at a frequency that enables sufficient supply power via the capacitor. Alternative connections of the back electrode to the power source may be considered, e.g. a galvanic connection.

In practice the load arrangement may have multiple loads, e.g. a pattern of multiple light sources and associated mirrors to cover an extended area while substantially provided homogeneous light emission from the emission surface. In such arrangement, the front and/or back electrodes may be shared by multiple loads.

Figure 2:
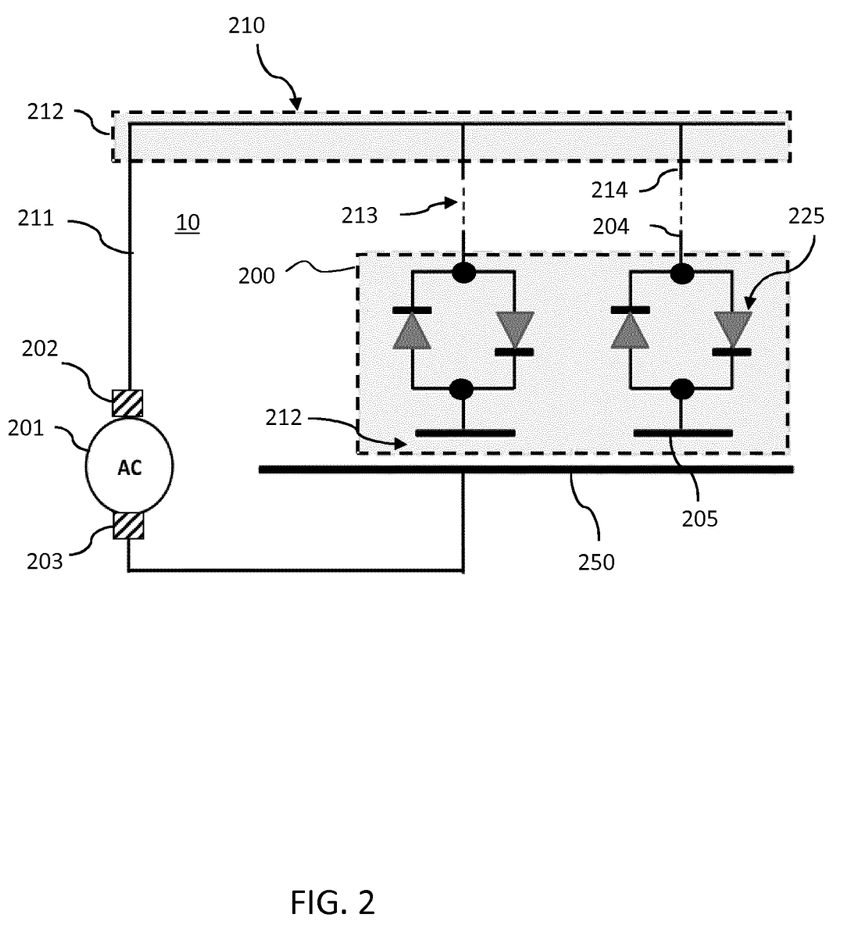
FIG. 2 shows a second example of a load arrangement having a galvanic front electrode.

FIG. 2 shows a second example of a load arrangement having a galvanic front electrode. In the example, the load is a set 225 of UV-C LEDs for emitting anti-fouling light coupled between first and second power nodes shown as black dots. The load arrangement comprises a carrier 200 as indicated by dashed lines and a transmitter arrangement 210 has a supply line 211 in an isolating material 212, which is coupled to a first pole 202 of a power source 201. From the isolating material transmitters 214 extend into the liquid, the transmitters being in galvanic contact with the liquid. The transmitters are arranged near respective front electrodes 204, thereby forming relatively short conductive paths 213 via the liquid.

In a practical embodiment, the transmitter arrangement has isolated conductors arranged in a pattern distributed across the area of the marine structure having the carriers for coupling each transmitter to one or more front electrodes. The back electrodes 205 are arranged for capacitive coupling to the marine structure 250. The load arrangement may be similar to the example shown in FIG. 1.

In FIG. 2, the power source 201 is an AC power source (e.g. in the 100-440 kHz region or at 7.56 or 13.56 MHz) of which one pole 202 is connected to the LED's (here shown in anti-parallel pairs, so that both semi-phases are used for UV generation) through the transmitter arrangement 210. The other pole 203 is connected to conductive parts of the marine structure for making a second electrical power connection through said capacitors formed by the conductive parts and the back layers.

It is noted that leakage currents may occur, as the sea water may form undesired electrically conductive paths to unprotected metal areas of the marine structure 250, e.g. parts of a ship's hull, a propeller or a rudder or other in the sea water submerged metallic regions of the marine structure (e.g. bow thruster tunnel). Effectively, due to the conductive paths 213 between the transmitters and front electrodes being short and having a relatively low impedance, most of the current from the power source will flow through the loads.

Next to avoiding the occurrence of undesired leakage currents, potentially leading to (electro-chemical) corrosion phenomena, the capacitive coupled transmitters can also serve as current limiters for the LED's. For driving a single pair of anti-parallel UV-LED's at about 100 kHz, a capacity value for the transmitter is required that corresponds with a transmitter area that may be larger than the area to be kept clean by the UVC from these LED's. Hence, alternatively to the planar capacitive transmitter, more compact discrete (ceramic) capacitors can be used equipped with sea water borne Pt/Ti wires to provide the electrical connection to the sea water. Another option is to apply a higher drive frequency (e.g. >2 MHz).

In the concept the supply line feeds various electrodes extended into the sea water at positions closely to the respective receivers. The actual wiring can come in various shapes such as in grids, conductive mesh, or in fishbone-like shapes. They may be positioned in between (groups of) tiles, or superimposed on top of tiles. The advantage of this concept is that the wireless path in the sea water to the LEDs is short-distance and, hence, a good competition towards parasitic current paths is obtained. Now, in the case of short circuiting scratches or other damages, only supply to tiles that are in the immediate vicinity of the damage is affected.

Figure 3:
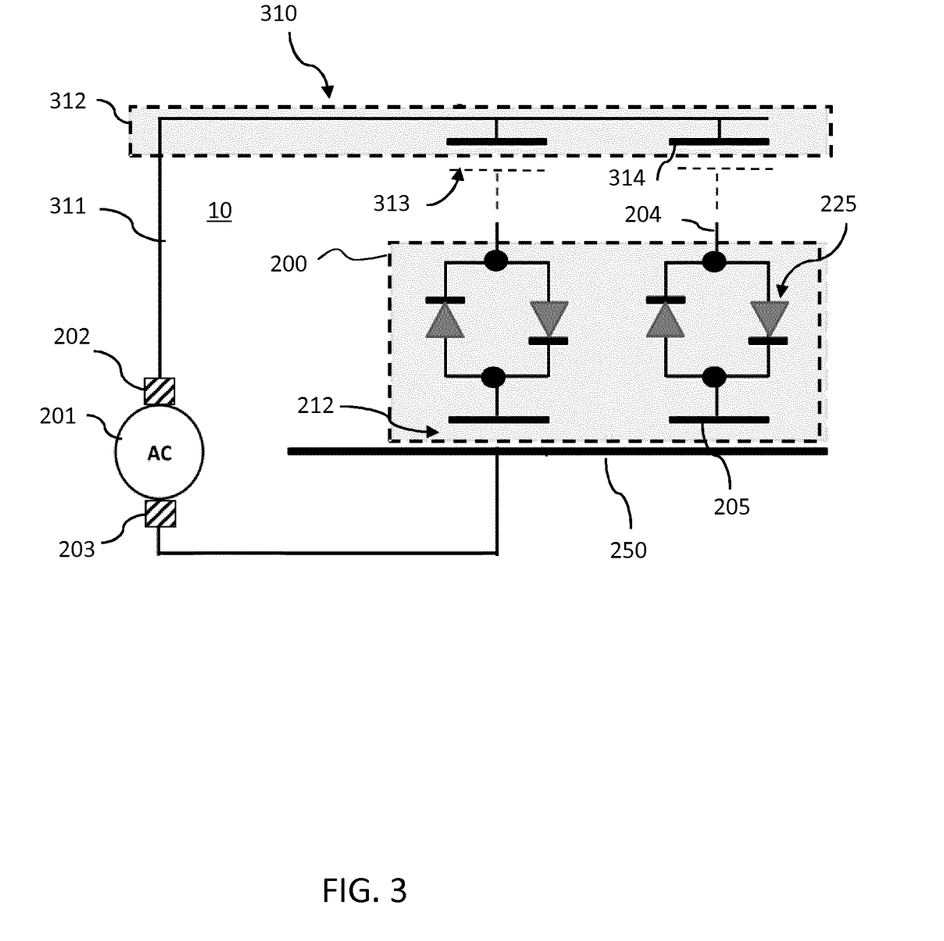
FIG. 3 shows a third example of a load arrangement having capacitive transmitters.

FIG. 3 shows a third example of a load arrangement having capacitive transmitters. In the example, the load is a set 225 of UV-C LEDs for emitting anti-fouling light coupled between first and second power nodes shown as black dots. The carrier medium 200 is similar to the example shown in FIG. 2, having front electrodes 204 that are in galvanic contact with the liquid. A transmitter arrangement 310 has a supply line 311 in an isolating material 312 which is coupled to a first pole 202 of an AC power source 201. So, the supply line has a supply conductor in an isolating cover and each transmitter 314 comprises a transmitter layer embedded in the isolating cover near the surface thereof. The transmitter layer is electrically conductive and connected to the supply conductor to form, in combination with an opposite area 313 of the liquid and a dielectric layer constituted by material of the isolating cover, a transmitter capacitor for capacitive transfer of the supply current between the supply line and the liquid. Each capacitor is formed by a conductive transmitter layer opposite to a section of the liquid and a dielectric layer formed by the isolating material. The transmitters are arranged near respective front electrodes 204, thereby forming relatively short conductive paths via the liquid.

The transmitter arrangement now has an isolated wire with local capacitive interconnects towards the sea water. These capacitive interconnects serve as current limiters in the case of a short circuit to a near scratch in the ship's hull or if a tile is damaged. As a result, the power supply to the other tiles will hardly be affected.

In an embodiment, the transmitter arrangement has a multi-lead cable. Respective transmitters are formed at respective leads. The multi-lead cable is configured to connect the leads to said other pole of the power source for constituting the supply line and to separate and distribute the leads across the surface of the marine structure for arranging the transmitters near the front electrodes. Optionally, the transmitter arrangement as a wire-mesh having isolated wires and respective transmitters at respective wires. The wire-mesh is configured to connect to said other pole of the power source for constituting the supply line and to distribute the wire-mesh across the surface of the marine structure.

In an embodiment, the carrier medium comprises inductors connected with the loads for constituting, in combination with at least one of the back, front and transmitter capacitors, circuits resonant at a resonance frequency being powered by the power source generating an AC supply voltage at the resonance frequency.

The circuit may be resonant at a resonance frequency for cooperating with the power source generating an AC supply voltage at the resonance frequency. Effectively, by forming a resonant circuit, the impedance of the circuit as present between the conductors of the transmitter arrangement and the liquid is lowered. Optionally, the carrier comprises a capacitor connected in series with the load. Such capacitance may further contribute to achieving a desired resonance frequency. Dimensioning the inductors and capacitors may be based on the following analysis.

The capacity of an AC capacitive plate transmitter is given by $$C = \varepsilon_0 \varepsilon_r A/d$$

with A is the surface, d is the thickness of the gap from the plate to the sea water, $\varepsilon_0 = 8.854 \cdot 10^{-12}$ F/m, $\varepsilon_r = 2.75$ (for silicone as material of the carrier). For a gap between 0.1 mm, and a plate surface of 50×50 mm², the value of the coupling capacitor is $C = 6 \cdot 10^{-10}$ F. For a frequency of f=100 kHz the ac resistance is given by $$Z = 1/i\omega C$$

So a typical value for |Z| for this capacitor is |Z|=2.6 kOhm. This is larger than the typical resistance of an UVC LED which is about 6V/15 mA=400 Ohm. Hence if a single set of LED's is used, this leads to considerable power loss due to the resistance of the capacitive coupler. At higher frequency (e.g. >2 MHz) the resistance of the coupler is smaller and therefore the power loss is reduced.

The power loss may be prevented by placing an inductive coil L in series with the coupling capacitor. The total resistance of the capacitor and the inductor is given by $$Z = i\omega L + 1/i\omega C$$

and $$|Z| = (1-\omega^2 LC)/\omega C$$

The value of |Z| reduces to zero at the resonance frequency of $$\omega_r = 1/\sqrt{LC}$$

At this resonance frequency, the capacitor loss is compensated for by the inductor. For $C = 6 \cdot 10^{-10}$ F. and $\omega_r = 2\pi 1 \cdot 10^5 = 6 \cdot 10^5$ Hz, the required value of inductance is given by L=5 mH.

In an embodiment, the resonance frequency may be made different for different sections of the ship by choosing dedicated values for C and L. These sections can then be selectively powered by respective different AC power sources, or a controllable AC power source by tuning/adjusting the frequency to match with their specific resonance frequency. Via this approach wireless AC powering can be directed towards loads in selective areas of the surface of the marine structure. For example, power can selectively be directed to areas of LEDs that are at some distance from short-circuited locations.

Figure 4:
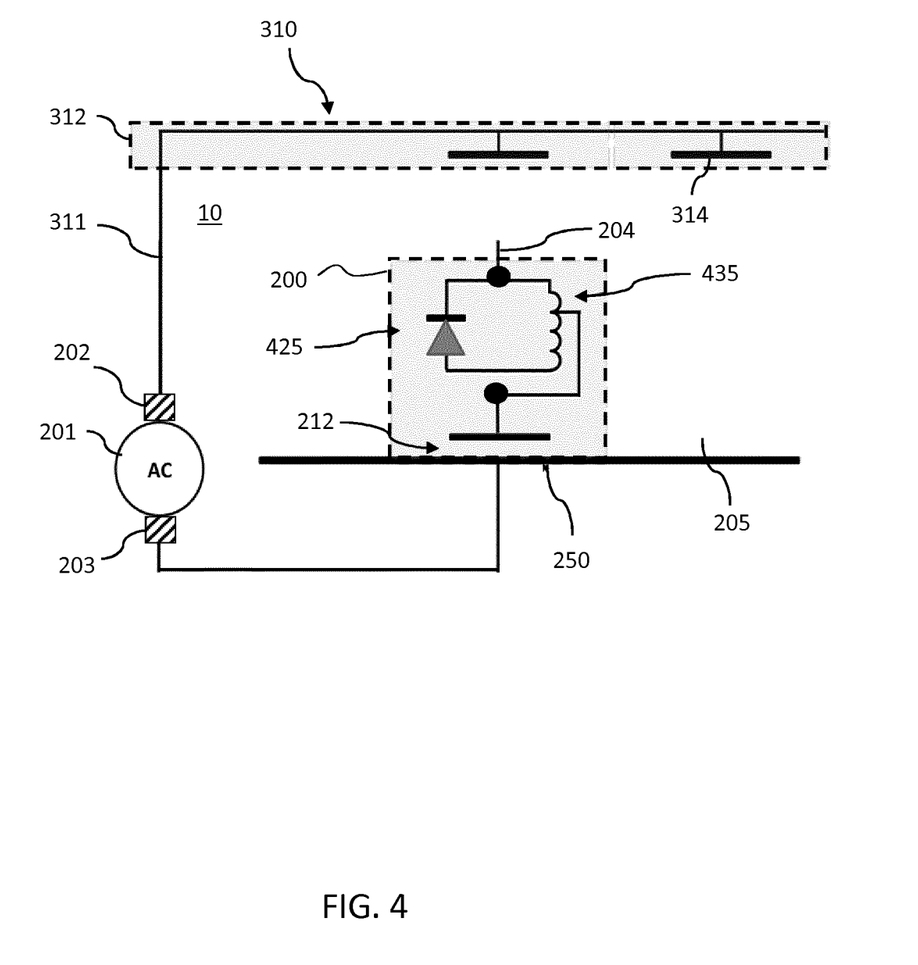
FIG. 4 shows a further example of a load arrangement having capacitive transmitters.

FIG. 4 shows a further example of a load arrangement having capacitive transmitters. In the example, the load 425 is an UV-C LED for emitting anti-fouling light coupled between first and second power nodes shown as black dots. The carrier medium 200 is similar to the example shown in FIG. 2, having front electrodes 204 that are in galvanic contact with the liquid. A transmitter arrangement 310 has a supply line 311 in an isolating material 312 which is coupled to a first pole 202 of an AC power source 201. The transmitter arrangement has been described with reference to FIG. 3.

In the example, the carrier medium comprises an auto-transformer 435 connected with the load. The auto-transformer has a low voltage connection connected to the front and back electrodes via the power nodes, and a high voltage connection connected to the load. The autotransformer may be a boost transformer, for example having a winding ratio N=1:7 between two nested coils, one low-resistance high-current primary coil and a voltage up transforming low-current secondary coil. First, the driven energy is stored in the primary coil. Once the AC signal goes through zero, this energy is released and up transformed to a higher voltage sufficient to operate the UV-LED. The key advantage of this concept is that the autotransformer circuit in resonance may have very low impedance. Thus, competition with a short circuit due to a scratch at some distance is better. Furthermore, the input voltage is transformed upwards allowing for a low-voltage high-current generator operation. Different capacitor and inductor values can be selected to allow for selective driving of specific parts of the hull as described above.

Optionally, nested lines of distributed capacitive anodes are used. For example, a grating or a mesh or another form an isolated power wire is distributed across the hull. In between the open areas, tiles of capacitive coupled auto transformers are distributed as desired. The current per area may so be distributed along the surface covered by a transmitter arrangement. Hence, the total current for the whole length of the supply line is the same as the current via the corresponding surface area. From the transmitter arrangement, fractions of the total current are available at given positions along the line, and per length only so much current is available at short distance. Hence, competition towards short-circuits is improved from a geometric point of view.

It will be clear to a person skilled in the art that the invention is not limited to the examples discussed in the foregoing, but that several amendments and modifications thereof are possible. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species". Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

Finally, use of the above load arrangement is foreseen, in particular use of the load arrangement installed to an exposed surface of a marine structure for anti-fouling of the exposed surface when immersed in a fouling liquid containing biofouling organisms. The use requires the lighting arrangement to be powered by an AC power source having a sufficiently high frequency to pass the required power to the light source via the capacitor. So, the load arrangement 100 according to the invention may be applied on a vessel's hull. Other examples of the exposed surface 30 include the exterior surface of box coolers, surfaces of subsea off-shore equipment, interior walls of water reservoirs like ballast tanks of vessels, and filter surfaces of filter systems in desalination plants.

Summarizing, a load arrangement is provided to power loads on a surface of a marine structure exposed to a fouling liquid, and has a transmitter arrangement and at least one carrier medium having embedded loads. Front electrodes are arranged to be coupled to the liquid, and back electrodes have back electrically conductive layers embedded in the carrier medium to form, in combination with an opposite area of the marine structure and a dielectric layer, a back capacitor for capacitive transfer of the supply current between the second power node and one pole of the power source coupled to the marine structure. The transmitter arrangement has a supply line and a multitude of transmitters galvanically connected to the supply line. The multitude of transmitters is distributed along the supply line to be arranged near the multiple front electrodes to form short conductive paths.

The invention claimed is:

1. A load arrangement, the load arrangement comprising:
   a transmitter arrangement; and
   at least one carrier medium, the carrier medium having a back surface and a front surface, the carrier medium comprising:
     a plurality of loads,
       wherein the plurality of loads are embedded in the carrier medium,
       wherein each load is coupled between a first power node and a second power node, and
       wherein each load is arranged to receive for receiving supply current from a power source;
     a plurality of front electrodes, and
       wherein the plurality of front electrodes are disposed on the front surface,
       wherein each front electrode is connected to the first power node wherein each front electrode is coupled to an electrically conductive medium, and
       wherein the electrically conductive medium is a liquid;
     one or more back electrodes,
       wherein the one or more back electrodes are connected the second power node,
       wherein the back surface is arranged in or on a surface of a marine structure,
       wherein the front surface is in contact with the liquid,
       wherein each back electrode comprises a back electrically conductive layer embedded in the carrier medium,
       wherein the back electrically conductive layer is embedded near the back surface,
       wherein the back electrically conductive layer is arranged to form, in combination with an opposite area of the marine structure and a dielectric layer, a back capacitor,
       wherein the back capacitor is arranged for capacitive transfer of the supply current between the second power node and one pole of the power source;
   wherein the carrier medium is shaped like a sheet,
   wherein the transmitter arrangement has a supply line,
   wherein the supply line is arranged to electrically couple to the other pole of the power source and a plurality of transmitters,
   wherein each of the plurality of transmitters is galvanically connected to the supply line,
   wherein the plurality of transmitters are distributed along the supply line,
   wherein the plurality of transmitters is arranged in contact with the electrically conductive medium near the multiple front electrodes, and
   wherein respective transmitters are located near respective one or more front electrodes.

2. The load arrangement according to claim 1,
   wherein the front electrodes comprise conductive parts at the front surface,
   wherein the conductive parts are galvanically in contact with the liquid, and
   wherein the conducive parts arraigned for transfer of the supply current between the first power node and the electrically conductive medium.

3. The load arrangement according to claim 1,
   wherein the front electrodes comprise electrically conductive layers,
   wherein the electrically conducive layers are embedded in the carrier medium near the front surface,
   wherein the embedded layers being arranged to form front capacitors in combination with an opposite area of the liquid and a dielectric layer constituted by material of the carrier medium, and
   wherein the front capacitors are arranged for capacitive transfer of the supply current between the first power node and the electrically conductive medium.

4. The load arrangement according to claim 1, wherein the supply line comprises:
   a supply conductor in an isolating cover; and
   one or more transmitters,
   wherein each of the one or more transmitters comprise an electrically conductive protrusion,
   wherein the protrusion extends from the isolating cover,
   wherein the protrusion is arranged to contact the liquid and the one or more transmitters,
   wherein the protrusion is formed by bare areas of the supply conductor,
   wherein the protrusion is formed locally not having the isolating cover for contacting the liquid,
   wherein the one or more transmitters are formed by bare areas of the supply conductor, and
   wherein the one or more transmitters are formed locally not having the isolating cover for contacting the liquid.

5. The load arrangement according to claim 1,
   wherein the supply line comprises a supply conductor in an isolating cover,
   wherein each transmitter comprises a transmitter layer embedded in the isolating cover near the surface thereof,
   wherein the transmitter layer is electrically conductive and connected to the supply conductor, wherein the transmitter layer is arranged to form, a transmitter capacitor in combination with an opposite area of the liquid and a dielectric layer constituted by material of the isolating cover, and wherein the transmitter capacitor is arranged for capacitive transfer of the supply current between the supply line and the liquid.

6. The load arrangement according to claim 1, wherein the transmitter arrangement comprises a multi-lead cable, wherein the multi-lead cable has respective transmitters at respective leads, wherein the multi-lead cable is configured to connect the leads to the other pole of the power source, wherein the multi-lead cable constitutes the supply line, and wherein the multi-lead cable is arranged to separate and distribute the leads across the surface of the marine structure.

7. The load arrangement according to claim 1, wherein the transmitter arrangement comprises a wire-mesh, wherein the wire-mesh has isolated wires and respective transmitters at respective wires, wherein the wire-mesh is configured to connect to the other pole of the power source, wherein the wire-mesh constitutes the supply line, and wherein the wire-mesh is arranged to distribute the wire-mesh across the surface of the marine structure.

8. The load arrangement according to claim 1, wherein the carrier medium comprises inductors connected with the loads, wherein the inductors are arranged to constitute, in combination with at least one of the back, front and transmitter capacitors, circuits resonant at a resonance frequency, wherein the inductors are powered by the power source, and wherein the power source generates an AC supply voltage at the resonance frequency.

9. The load arrangement according to claim 1, wherein the carrier medium comprises auto-transformers connected with the loads, wherein each auto-transformer has a low voltage connection connected to the front and back electrodes, and wherein each auto-transformer has a high voltage connection connected to the load.

10. The load arrangement according to claim 8, wherein different inductors or autotransformers in combination with respective back, front and transmitter capacitors constitute respective circuits resonant at different resonance frequencies, wherein the circuits are arranged are selectively powered by the power source, and wherein the power source generates an AC supply voltage at the different resonance frequencies.

11. The load arrangement according to claim 1, wherein the carrier medium comprises capacitors connected in series with the loads.

12. The load arrangement according to claim 1, wherein the carrier medium is an optical medium, wherein the load is an UV light source, wherein the UV light source emits anti-fouling light for anti-fouling of the surface of the marine structure, wherein at least a portion of the surface is in contact with the liquid.

13. A marine structure comprising:

at least one load arrangement as claimed in claim 1;

a surface exposed to the electrically conductive medium; and the power source, wherein the power source is coupled between the marine structure and the supply line of the transmitter arrangement, wherein the power source is arranged to transfer the supply current from the power source to the loads, wherein the at least one carrier medium is attached to the marine structure, wherein the back surface is in or on the surface of the marine structure, wherein the at least one transmitter arrangement is arranged at the surface of the marine structure near the multiple front electrodes.

14. The marine structure of claim 13, wherein the total number of transmitters of the at least one transmitter arrangements is less than the total number of front electrodes of the at least one carrier medium.

15. The load arrangement according to claim 9, wherein different inductors or autotransformers in combination with respective back, front and transmitter capacitors constitute respective circuits resonant at different resonance frequencies, wherein the circuits are arranged are selectively powered by the power source, and wherein the power source generates an AC supply voltage at the different resonance frequencies.

16. The load arrangement according to claim 1, wherein the liquid is a fouling liquid containing biofouling organisms.

* * * * *